C. J. LANTIS.
HEADLIGHT CONTROL.
APPLICATION FILED OCT. 17, 1916.
1,233,886.
Patented July 17, 1917.
2 SHEETS—SHEET 1.
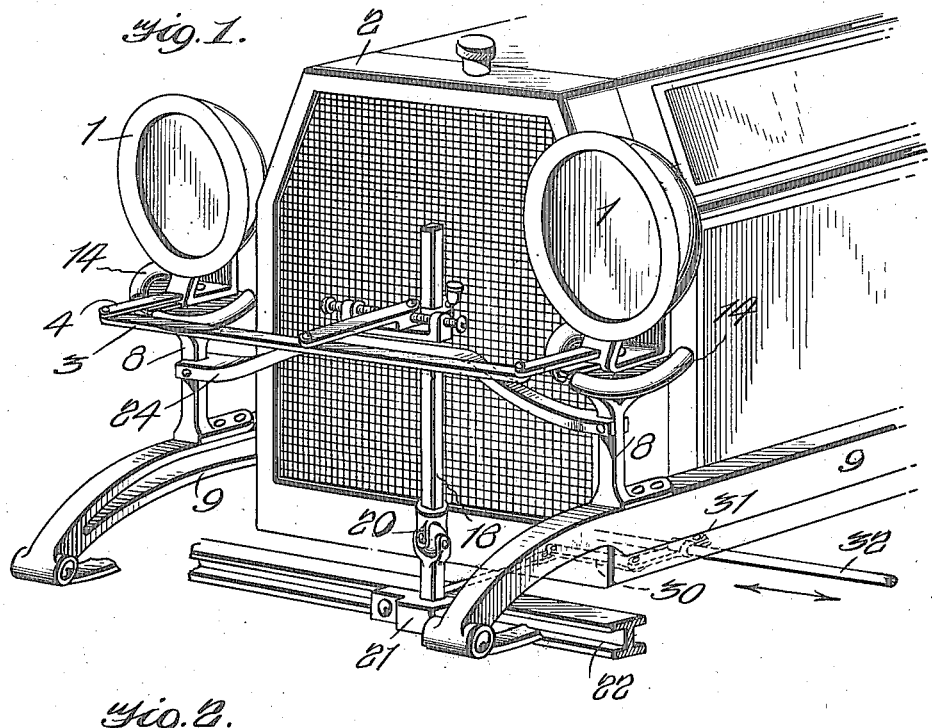
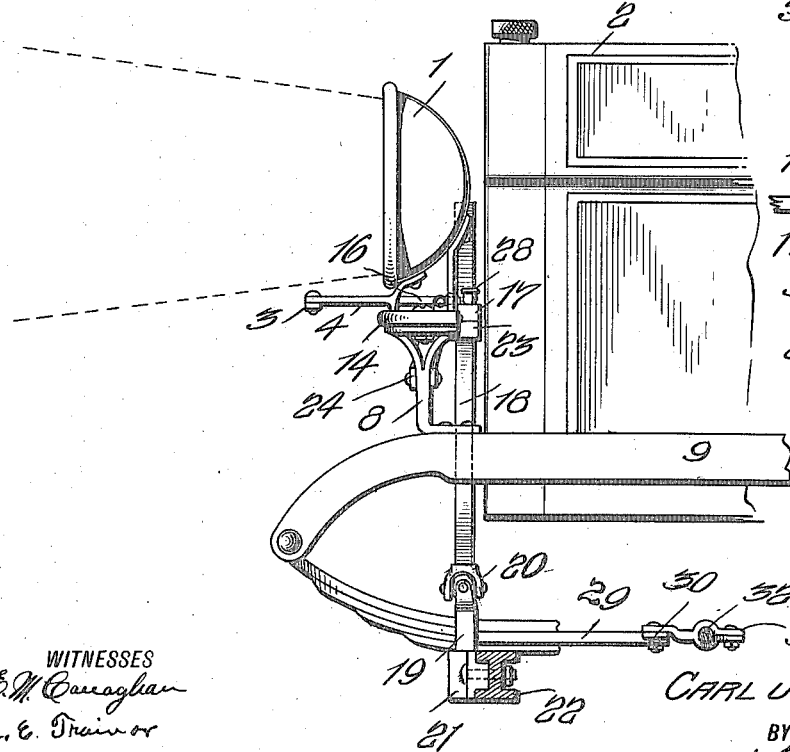
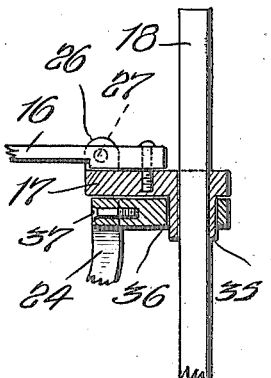
WITNESSES
INVENTOR
CARL J. LANTIS,
BY
ATTORNEYS

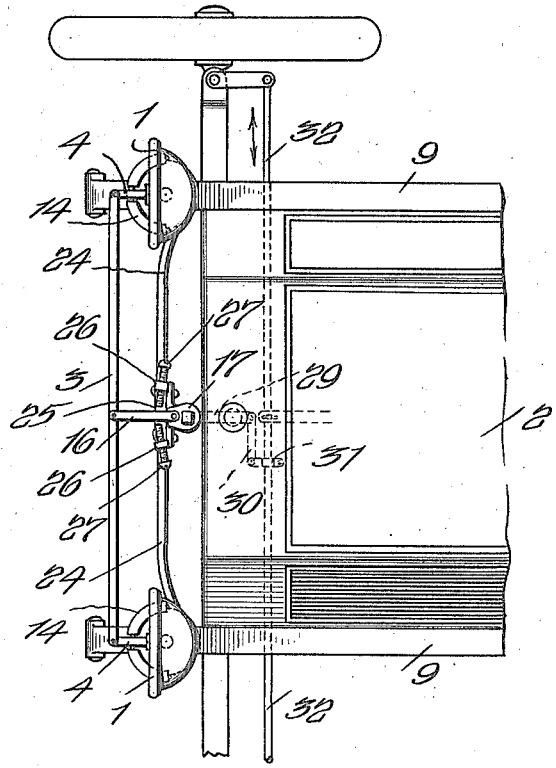
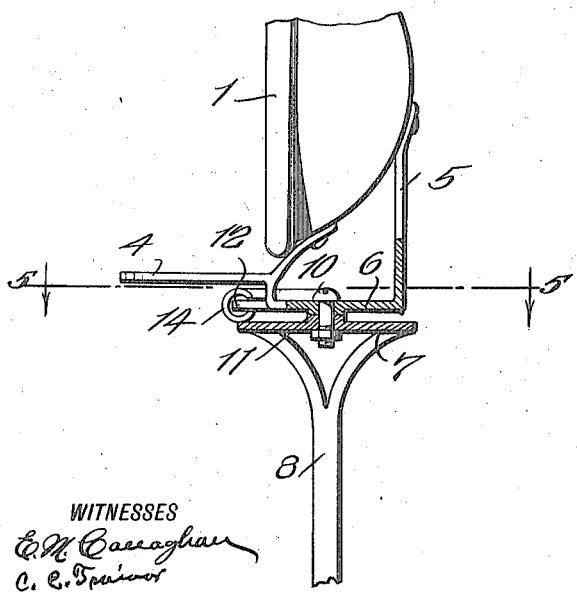
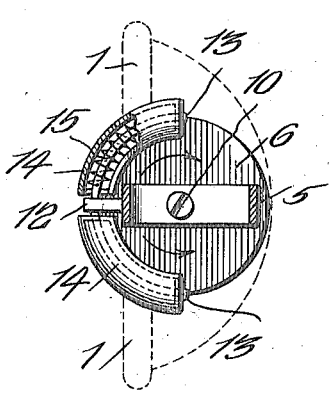

UNITED STATES PATENT OFFICE.

CARL JAMES LANTIS, OF CHAPMAN, KANSAS.

HEADLIGHT CONTROL.

1,233,886.    Specification of Letters Patent.    Patented July 17, 1917.

Application filed October 17, 1916. Serial No. 126,112.

*To all whom it may concern:*

Be it known that I, CARL JAMES LANTIS, a citizen of the United States, and a resident of Chapman, in the county of Dickinson and state of Kansas, have invented an Improvement in Headlight Controls, of which the following is a specification.

My invention is an improvement in headlight controls, and has for its object to provide mechanism, in connection with headlights for motor vehicles, for constraining the lights to swing with the wheels to direct the beam of light over the path to be traveled, wherein an adjustable connection is provided between the steering mechanism and the controlling mechanism for the headlights for permitting a limited movement of the steering mechanism without affecting the headlight control and wherein a yielding connection is provided between the headlight control and the headlights.

In the drawings:

Figure 1 is a perspective view of the front of a motor vehicle provided with the improved control.

Fig. 2 is a side view.

Fig. 3 is a top plan view.

Fig. 4 is a sectional detail of the connection between the control and the headlights.

Fig. 5 is a section on the line 5—5 of Fig. 4, with parts broken away.

Fig. 6 is a detail sectional view through the connection between the operating means and the sectional bar.

The present embodiment of the invention is shown in connection with the headlights 1 of a motor vehicle indicated at 2. The controlling mechanism for the headlights comprises a connecting rod 3, having its ends connected with arms 4 extending forwardly from the supporting bracket 5 for the headlight, the said bracket carrying the upper half 6 of a turn-table. The lower half 7 of the turn-table is supported by a bracket 8 connected with the frame 9 of the motor vehicle, and the turn-table portions are connected by a bolt and nut 10 which passes through the center of the said table section, and it will be noticed that the said table sections have spacing nipples 11 at the bolt.

The upper table section 6 is provided with a radial lug 12 at its front, and this lug is arranged between a pair of arc-shaped rods 13, which are slidably mounted in arc-shaped guides 14 held on the lower section 7 of the turn-table. Each of these rods is normally pressed toward the lug 12 by a coil spring 15 which encircles the rod, being connected at one end to the rod and at the other end to the casing, and the rods are arranged to provide a yielding connection between the turn-table sections. These guide casings 14 are slotted on their inner sides, as shown more particularly in Fig. 4, to permit the passage of the lug, and it will be evident that the tension of the springs may be varied to suit conditions of use.

The connecting rod 3 is operated by an arm 16, which is pivoted at one end to the rod 3 and at the other to a plate 17, which is slidably mounted on the upper section 18 of a bar, which is connected to the lower section 19 by a universal joint 20. The lower section 19 of the bar has a rounded portion journaled in a bearing 21 on the axle 22 of the vehicle. The upper section of the bar is mounted to turn and slide in a bearing 23 in the body of a yoke 24 which connects the brackets 8 before-mentioned. The plate 17 before-mentioned has an extension 25, which is provided with upstanding lugs 26 on each side of the arm 16. Set screws 27 are threaded through the lugs, and these set screws are adapted to engage opposite sides of the arm, to cause the arm to move with the plate 17, but permitting a limited lost motion connection between the arm and the plate.

An oil cup 28 is arranged on the plate 17, the cavity of the cup communicating with the bore of the plate in which the section 18 of the bar slides, and the oil in the cup keeps the bearing lubricated, so that movement of the body with respect to the axle due to the spring connection will not interfere with the connection between the bar and the controlling mechanism for the headlights.

The movement of the bar 18 is brought about through an arm 29 extending rearwardly from the bar, which is connected by a link 30 with a clip 31 on the connecting rod 32 between the knuckle arms of the spindles. When the steering control is operated to swing the wheels, the sectional bar 18—19 will be oscillated and the arms 16 will be operated to move the rod 3 controlling the headlight. The lost motion between the plate 17 and the arm 16, that is between the controlling mechanism and the operating mechanism, may be varied by means of set screws 27 to permit a limited swinging movement of the wheels due to roughness and inequalities of the road, without affecting the lights, and this may be so adjusted that only when the wheels are turned to guide the vehicle will the lights be affected.

On smooth, level roads, the connection may be made closer so that the lights will answer at once to the turning of the wheels. The yielding connection between the lights and the controlling means prevents jar or injury to the lights from a sudden movement of the wheels.

The plate 17 has a bearing 35 which is shaped internally to fit the bar 18, and externally to fit a rounded opening in a bearing plate 36, which is secured to the bracket 24 before-mentioned, by means of screws 37 or the like. This bearing 35 is of a length to permit the vertical movement of the bearing with respect to the bearing plate 36, during downward movement of the frame with respect to the axle, without disengaging the bearing 35 from the bearing plate 36.

I claim:

1. In a motor vehicle, the combination with the headlights, of a sectional bracket for mounting each light, and comprising a lower section connected with the frame and an upper section mounted to rotate on the lower section and carrying the light, a yielding connection between the sections for normally holding the lights in normal position, and means controlled by the steering of the vehicle for simultaneously swinging the lights, said yielding connection comprising a radial lug on the upper section, arc shaped casings at the opposite sides of the said lug, and slotted to permit the passage of the lug and springs in the casing.

2. In a motor vehicle the combination with the headlight, of a sectional bracket for mounting each light, the sections of each bracket being mounted to turn with respect to each other, a bar connecting the upper sections for simultaneously turning the said sections, a sectional bar connected with the frame of the vehicle and slidably connected with the body of the vehicle, an operating arm connected with the first mentioned bar and having a lost motion and slidable connection with the last-named bar, means for varying the extent of the lost motion between the arm and said last-named bar, and a universal joint connection between the sections of the sectional bar.

CARL JAMES LANTIS.

Witnesses to signature:
 H. E. BRECHBILL,
 EMERY BUHRER.